United States Patent [19]

Brandon et al.

[11] Patent Number: 4,924,303
[45] Date of Patent: May 8, 1990

[54] METHOD AND APPARATUS FOR PROVIDING INTERACTIVE RETRIEVAL OF TV STILL FRAME IMAGES AND AUDIO SEGMENTS

[75] Inventors: Daniel Brandon, Littleton, Colo.; Kenneth N. B. Dunlop, 9743 E. Crestline Cir., Englewood, Colo. 80111; Lester B. Jensen, Denver, Colo.; Richard M. Lucas, 8350 W. Baker Ave., Lakewood, Colo. 80227; Robert E. Pietruszewski, 3126 Stuart St., Denver, Colo. 80212.

[73] Assignees: Kenneth Dunlop; Richard Lucas; Robert Pietruszewski, all of Denver, Colo.

[21] Appl. No.: 240,663

[22] Filed: Sep. 6, 1988

[51] Int. Cl.[5] .............................................. H04N 7/10
[52] U.S. Cl. ................................ 358/86; 358/143; 358/147; 379/105
[58] Field of Search ................................ 358/84–86, 358/142, 143, 146, 147; 379/92, 96, 102, 104, 105; 455/2, 9, 5

[56] References Cited

U.S. PATENT DOCUMENTS

| | | | |
|---|---|---|---|
| 3,859,458 | 1/1975 | Takezawa et al. | 358/143 |
| 4,518,989 | 5/1985 | Yabiki et al. | 358/86 |
| 4,536,791 | 8/1985 | Campbell et al. | 358/86 X |
| 4,602,279 | 7/1986 | Freeman | 358/86 |
| 4,616,263 | 10/1986 | Eichelberger | 358/185 |
| 4,734,764 | 3/1988 | Pocock et al. | 358/86 |
| 4,757,371 | 7/1988 | Nozawa et al. | 358/86 |
| 4,789,895 | 12/1988 | Mustafa et al. | 358/147 |

OTHER PUBLICATIONS

Robinson et al., "'Touch-Tone' Teletext A Combined Teletext-View Data System", *IEEE Transactions on Consumer Electronics*, CE-25, No. 3, Jul., 1979, pp. 298 & 300-303.

*Primary Examiner*—Keith E. George
*Attorney, Agent, or Firm*—Francis A. Sirr

[57] ABSTRACT

A TV still frame image, perhaps with an accompanying audio segment, information retrieval system is disclosed. The system allows end users to search for, order, and retrieve still frame video images, which images are then displayed on a conventional television set. Related audio sound can be heard over the same television set, over a telephone, or over another audio device. A data base of images and sound is stored on storage devices that are controlled by a general purpose computer system. This data base is located at the "head end" of the system. In one mode of operation, an end user requests and receives a particular video image(s), and perhaps a sound segment(s), from a plurality of such images that are continuously being sent to all end users. In a second mode of operation an end user requests a data base image that is not presently being sent to all end users. In this second mode of operation, appropriate data base files at the head end are addressed, the requested image(s) are retrieved from the data base files, and the requested image(s) are sent to that end user with an accompanying end user address. In a third mode of operation, the end user operates as in the second mode of operation, with the additional feature that the requested images, and perhaps sound, can be addressed to another end user(s), and perhaps also to the requesting end user.

7 Claims, 3 Drawing Sheets

METHOD AND APPARATUS FOR PROVIDING INTERACTIVE RETRIEVAL OF TV STILL FRAME IMAGES AND AUDIO SEGMENTS

DESCRIPTION

1. Field of the Invention

This invention relates to the field of interactive communications systems, and more particularly to systems that provide for interactive operation through the use of conventional television signal transmission means and conventional telephone signal transmission means.

2. Background of the Invention

On-line database information retrieval services available to home and business users generally require a computer system and a two-way telephone modem link. These services operate at various transmission rates (typically from 300 to 19000 baud), depending upon the equipment that is used by the end-user and is supported by the database vendor.

These information retrieval services are predominantly text only. Some graphics can be transmitted at the same speed as text, but such graphics must comprise text characters, or a special set of extended characters, or must use specialized software at the location of the end-user's computer in order to create the graphic images. The image resolution of such graphics is very limited, at currently practical transmission rates, due to the large amount of data required to describe an image. Data compression techniques can be used to transmit graphic images, but transmission times are generally long, and decompression and translation of the image into an appropriate format for display is also required.

The level of interactivity which can be achieved when using graphics on such an information retrieval service is limited, due to the length of time necessary to produce an image on the end-user's computer.

Teletext services allow information retrieval that is predominantly text and simple graphics. A limited amount of data is sent on a continuous basis in the vertical blanking interval of standard television signals. The amount of data so sent is restricted because the vertical blanking interval cannot contain large amounts of digital data, and the cycle time between the user's selection of a particular page of data and its display must be short in order to be acceptable. Text or graphics are viewed on a standard television receiver or on a computer display device. A computer, a teletext terminal, or special electronics built into the television set, permits selection of the data and creates the display. In a teletext system, specific information can be selected from the larger amount of information then being transmitted to all users, but a user cannot request specific different information to be transmitted at that time from a large data base of such information. Since the system cannot provide specific information which is tailored to the interests to one such user, the system is not truly interactive.

Semi-interactive television systems allow system end-users to use a telephone in order to call in a request for the transmission of slide show programs (i.e. still images) of varying length, comprised of individual fields or frames of video, usually with sound. The requested programs are displayed on a standard television receiver. Limitations of current systems restrict their usefulness for image and text data distribution.

Two prior art patents are known to the inventors that are of general interest. These patents are U.S. Pat. Nos. 4,602,279 and 4,616,263.

In the device of U.S. Pat. No. 4,602,279, a number of video tape recorders (22,24,26,28) provide a similar number of prerecorded video/sound signals. These prerecorded signals are individually linked to a satellite or to a microwave master distribution network (40). This network is in turn connected to a CATV network (10), where the individual prerecorded signals are combined into a multiplexed television signal that is transmitted to CATV users. The individual users receive the multiplexed television signal on a home unit (64). This home unit is connected to a conventional TV set (20) and includes a microcomputer (88) in which has been interactively stored the individual user's selection profile. This profile was previously created by the user interactively responding to items, such as questions, appearing on his TV screen. Subsequently, during transmission by the CATV system of a multiplexed signal (FIG. 6), this user profile selects from the multiplex signals, and presents segments thereof based upon the user profile.

U.S. Pat. No. 4,616,263 is of interest in that it describes a hybrid videotex system that utilizes CATV, or a similar system, to transfer full motion video, photographic stills and audio segments, and utilizes telephone facilities for the bidirectional transfer of information between an information provider and an information user.

In this patent (FIG. 1), a central data processing facility comprises (1) a communications interface processor subsystem, (2) a server processor subsystem, and (3) a video subsystem.

The central data processing subsystem controls the delivery of videotex and full motion video to information users. This facility coordinates requests for data that is received from the information users, and if the requested information is not resident in the central facility, a connection is set up between the user and the appropriate information provider, using a packet switching network.

The central data processing facilities' communication interface processor subsystem is coupled between the information providers and the information users, so as to control the transfer of all data between the central facility and either the information provider or the information user.

The central data processing facilities' server processor subsystem is coupled between the communications interface processor subsystem and the video subsystem. The data requested by the user (i.e. photographic stills, audio, and full motion segments) is stored at the video subsystem, and is scheduled for broadcast to a user upon request.

The server processor subsystem also coordinates and controls the information providers and the information users sessions, recording details such as length of the session, amount of data accessed, and billing information.

The video subsystem is linked to transmission media such as a CATV system, and is responsible for presenting enhanced videotex information to the user. Upon request, the video subsystem retrieves information from its storage means, injects the information into the appropriate time slot and TV channel, and sends the information to the CATV for broadcast to the information user. The video subsystem also notifies the user, via the server processor subsystem, when the requested information will be broadcast.

The information user is the end recipient of videotex data and full motion video segments. The end user's terminal, be it a dedicated device like a personal computer or a TV set with a special decoder box, interfaces both to a telephone network and to the CATV. Connection must first be set up over the telephone link, and then the videotex session can take place. During a videotex session, a full motion video segment may be requested via the telephone data connection. A Data message is then returned to the users' terminal, dictating the time and the channel for broadcast of the requested segment. The user's terminal will, at the dictated time, force-tune its CATV receiver to the dictated channel, and thereby receive the requested segment.

While these two patents represent attempts by prior workers in the art to provide an element of interactive communication, the prior art does not provide the flexibility and versatility provided by the present invention.

SUMMARY OF THE INVENTION

This invention relates to a method and an apparatus for providing end user interactive retrieval of television still frame images, and perhaps accompanying sound segments, from a library or data base of such images and sound segments.

The invention comprises three basic elements or components.

(1) An image/sound data base or library (also called the head end),
(2) A one-way video/two-way telephone communications system(s), and
(3) A plurality of end user installations, each such installation having a telephone or a telephone like device, and a television set, or a similar video receiver device (collectively called an end user control device, as is shown in FIG. 2).

The invention provides for the selection by end users from three possible modes of interactive operation or communication between an end user(s) and the head end.

In the first mode of operation, the head end continuously transmits a plurality of images, and perhaps related sound segments, to all end users, by the use of one (or more) TV channel, this TV channel being dedicated to the system of the invention. This plurality of images is also called a carousel, or carousel of images, in the following description. In order to receive one image, or one set of images, from the plurality of images, the user enters a code that identifies the desired image, or set of images. That image, or set of images, is then captured by the end user's control device, for display on the end user's TV set. In this mode of operation the end users do not control the images being transmitted by the head end.

In the second mode of operation, the head end is not currently sending the image(s) that is desired by an end user. In this case, the end user sends, keys-in, or dials-in, an instruction that is sent to the head end. The head end translates this instruction into an image(s) request comprising an image code(s) that identifies the desired image(s). In response to receiving this end user request, the head end retrieves the requested image(s) from storage, attaches an address directing the image(s) to the requesting end user's control device, and sends the image(s) to all end users. The control device of the requesting end user is the only control device that recognizes the address. As a result, the requested image(s) is captured by the requesting end user.

In the third mode of operation, a user has the capability of not only requesting an image(s) to be sent to all end users from the head end, but the requesting end user can also request that the requested image be transmitted with a plurality of user addresses. In this way a type of interactive conference image transmission can be provided, and the group of image receiving end users can also elect to be simultaneously interconnected by means of a conference telephone network.

At the head end, video still images, and audio segments corresponding to at least some of the video images, are stored in a computerized system. Video signals are generated at the head end for distribution to all end users. In two modes of operation (above mentioned modes two and three), distribution is based upon image selections that are made by one or more end users, and each end user's electronic control device captures only those video images that are addressed to that particular end user.

Video images are distributed using standard television signals and distribution techniques, for example NTSC techniques. The television signals are transmitted to all end users, on one (or more) TV channel, by way of any of a variety of well known and conventional transmitting means.

In one mode of operation (above mentioned mode one), each end user's electronic control device captures requested images from the plurality of images then being transmitted to all end users. If no images are requested by an end user, no images are captured by that end users electronic control device. Of course, in this mode of operation some images, for example menus, are captured automatically and displayed on all operative end user TV sets.

In all three modes of operation, a captured video image is displayed on a conventional television receiver, or on a similar video display device.

Each end user's electronic control device may include means for sending video image selection commands from the control device to the head end, and for receiving audio segments from the head end.

Interaction by the end user is achieved by entering image selections using the telephone portion of the control device, while connected to a standard telephone network, by using a standard telephone directly, or by using a computer.

The embodiments described herein relate to the use of telephone distribution and cable TV distribution networks. The invention finds utility with any of the well known networks of this general type.

An object of the invention is to provide interactive image and information retrieval through the use of the unique end user control device shown in FIG. 2. End users may search, order, and retrieve video images, which images are then displayed on an ordinary television set, or on a similar graphic display. Synchronized and related audio information can be heard over the same television set, over a telephone, or over other audio receiver devices.

The invention provides functionality which is not available in the prior art by uniquely combining the one-way communication provided by a TV channel with the two-way communications provided by a telephone, or by a similar two-way audio communications device.

In accordance with the present invention, images, sound and text are stored on digital and/or analog storage devices that are controlled by a head end's general purpose computer system. As requests for image, sound, text files are received by the head end, the appropriate files are addressed to the end user and then transmitted to all end users. Selected sound segments may also be sent to individual end users by means of a standard telephone network. Sound segments, except for TV channel sound, are sent to only one end user.

The basic components of the system of the invention are as follows:

ONE OR MORE GEOGRAPHICALLY DISTRIBUTED HEAD ENDS 800:

Head ends (see 800 of FIG. 1) comprise one or more geographically located central sites from which images, audio segments, and/or data are distributed to a large plurality of end users, two of which are shown at 804 and 805. A head end system broadcasts images, and perhaps related sound, over one television channel.

End users may obtain fully interactive access to a head end 800 through a telephone network 30,34. The head end system validates an end user's request, and then provides an interactive session that allows the end user to obtain selected images, sound, and data of choice (above mentioned modes two and three). Alternatively, semi interactive access may be obtained by entering selections into the end user's device 50,56, without the use of a telephone connection (above mentioned mode one).

Head ends 800 are geographically distributed according to the end user demands in each geographic area.

End users 805 that are located at the locale of the head end are directly connected to the head end by a no-charge telephone network 34. End users 804 that are located remote from the head end are connected to the head end by way of a head end extension 801, and by way of a leased telephone line that interfaces with telephone network 20. Audio segments may be stored at location of the head end extension, where they are available, on request by the remote end users 804. The video images for the remote end users are provided by a remote TV link that includes network 32.

Each head end 800 may contain data that is of specific interest only to end users 805 at the head end's geographic location. However, the various head ends may also share a common set of data that is of interest to end users of all geographic locations.

One or more of the head ends 800 may be connected to one or more head end extensions 801, to thereby form a data distribution network(s) to remotely located end users 804. Head ends therefore have the additional capability of distributing information to update the databases of other head ends, as well as to update the databases of head end extensions.

Head ends include a number of major components, as will be described relative FIG. 1, including; software controlled controlling computer or computers; a data storage system; a telecommunications system; a telephone communications management system; and an image assembler system.

The head end's controlling computer system controls menus that are presented to the end user TV sets on one TV channel thereof, selects images to be transmitted to end users, determines the audio sound segment(s) required for the images, if any, informs the image addressing system of the end user's address, and initiates distribution of the addressed image(s). All accounting, database management, and general system control are resident in the controlling computer system.

The head end's data storage system is composed of magnetic, optical or other data storage devices. These devices store data in either analog or digital format. The key data stored is the data that will be distributed to the end users. Data is primarily in the form of images (still pictures) represented electronically, and the sound information which is to accompany the images.

Data that is retrieved from the head end's data storage system as the result of an end user request (above mentioned modes two and three) is routed to an image assembler system and through multiple paths, such as a telecommunications unit, a telephone management system, and a central computer system.

The head end's telecommunications system manages the flow of data between the head end and a telecommunication network(s). Control data, accounting data, image data, sound and other data is routed to and from this telecommunications system, allowing communication with other head ends, database suppliers, vendors etc.

The head end's telephone communications management system has multiple telephone lines connected thereto. These telephone lines enable two-way telephone communication. Multiple end users can simultaneously connect to the telephone communications management system. Incoming information from an end user to the head end is in the form of standard telephone touch tones, modem (Modulator/Demodulator) communications, or speech. The preferred form is touch tone. Touch tones are interpreted into digital information for control of image selection. Data received by modem is treated similarly. End users may also interact by the use of speech, if necessary.

Each end user is able to receive sound messages over the telephone, which messages will usually be synchronized with the received video images. Sound may also be passed to the end user from a third party who is controlling the images seen (the above mentioned third mode). Thus, by passing through the telephone communications management system, an end user and another party may hold a two way conversation over the public telephone system, while viewing selected images.

Images stored at the data storage system are dispatched to the head end's image assembler system. The images are routed to, and stored in, digital buffers, individually addressed to an end user, and then assembled into a standard television signal for transmission to all end users.

Once a particular image is dispatched as a television signal, the head end's digital buffer in which the image was located becomes free to hold or display a subsequent video field (or frame). One or more channels of audio sound are modulated into the TV signal. Normally only one channel of audio is added.

ONE OR MORE HEAD END EXTENSIONS 801:

An extended head end telecommunications system (801 of FIG. 1) extends local, no-charge, dial up access to end users 804 that are remote from the head end. The head end's controlling computer system receives information from, and provides information to, the head end extension's telephone management system(s) through a leased telecommunications link. An extended head end system 801 may not be required for those head ends 800 that do not serve multiple telephone areas.

END USER CONTROL DEVICES 804,805:

The end user's control device 50,56 of FIG. 1 is connected to the end user's incoming standard television signal and to the end user's TV set. The end user's control device can also be connected to the telephone system. It should be noted that the end user control device can be operated with or without such a telephone connection. However, if a telephone connection is provided, the telephone connection is a two-way connection.

By way of instructions that are entered by the end user, the control device allows control of the images and audio to be received by that end user (above mentioned modes one, two and three). Images that contain the specific address of a control device 50,56 are automatically stored and displayed at the location of that end user (above mentioned modes two and three).

One way communication allows the end user to select a presentation from a large number of continuous audio/visual presentations that are being transmitted to all end users, i.e. also called "carousel" presentations, wherein a carousel consists of any number of continuous audio, visual, and/or audio/visual presentations (above mentioned mode one). To choose a carousel presentation, numbers are entered into a key pad at the end user's control device 50,56, or they are entered by way of a remote control device 52,54 that is connected to the control device by an infrared link.

Two way communication between the end user's control device and head end 800 is conducted through use of a telephone line. The telephone line allows the end user to send telephone instructions and to receive telephone audio.

The end user's television set displays the incoming still images being received over the television channel. The end user may use the control device 50,56 as a telephone, since it incorporates both a microphone and a dial tone generator.

The received sound signals, which are distributed under head end system control over either the television signal or telephone lines, are played over the sound channel of the end user's television set.

Control devices 50,56 may have the capability of storing sound that has been received in a compressed format, and to then play the sound back to the end user in real time, usually coordinated with received images.

In summary, it is an object of the invention to interactively provide related telephone generated sound output and cable generated TV images, where the telephone line also functions as a feedback route enabling an end user to determine the images/sound segments to be captured by that end user.

It is a further object of the invention to provide such an interactive system where the telephone line is used as a two-way means of communication, first to select a desired image(s), and later to receive audio sound segment(s) that are related to that image(s).

It is a further object of the invention to provide such an interactive system wherein selection of an image(s) includes the ability to request that the selected image(s) be addressed to a plurality of end users.

It is a further object of the invention to provide such an interactive system wherein an end user(s) may select from a plurality of modes of operation, one of which comprises the selection of an image(s) from a carousel of images, one of which comprises the selection of a non-carousel image(s) to be addressed to the requesting end user, and one of which comprises the selection of a non-carousel image(s) to be addressed to a plurality of end users.

These and other objects and advantages of the invention will be apparent to those of skill in the art upon reference to the following detailed description of the invention, which description makes reference to the drawing.

DETAILED DESCRIPTION OF THE INVENTION

Figure 1:
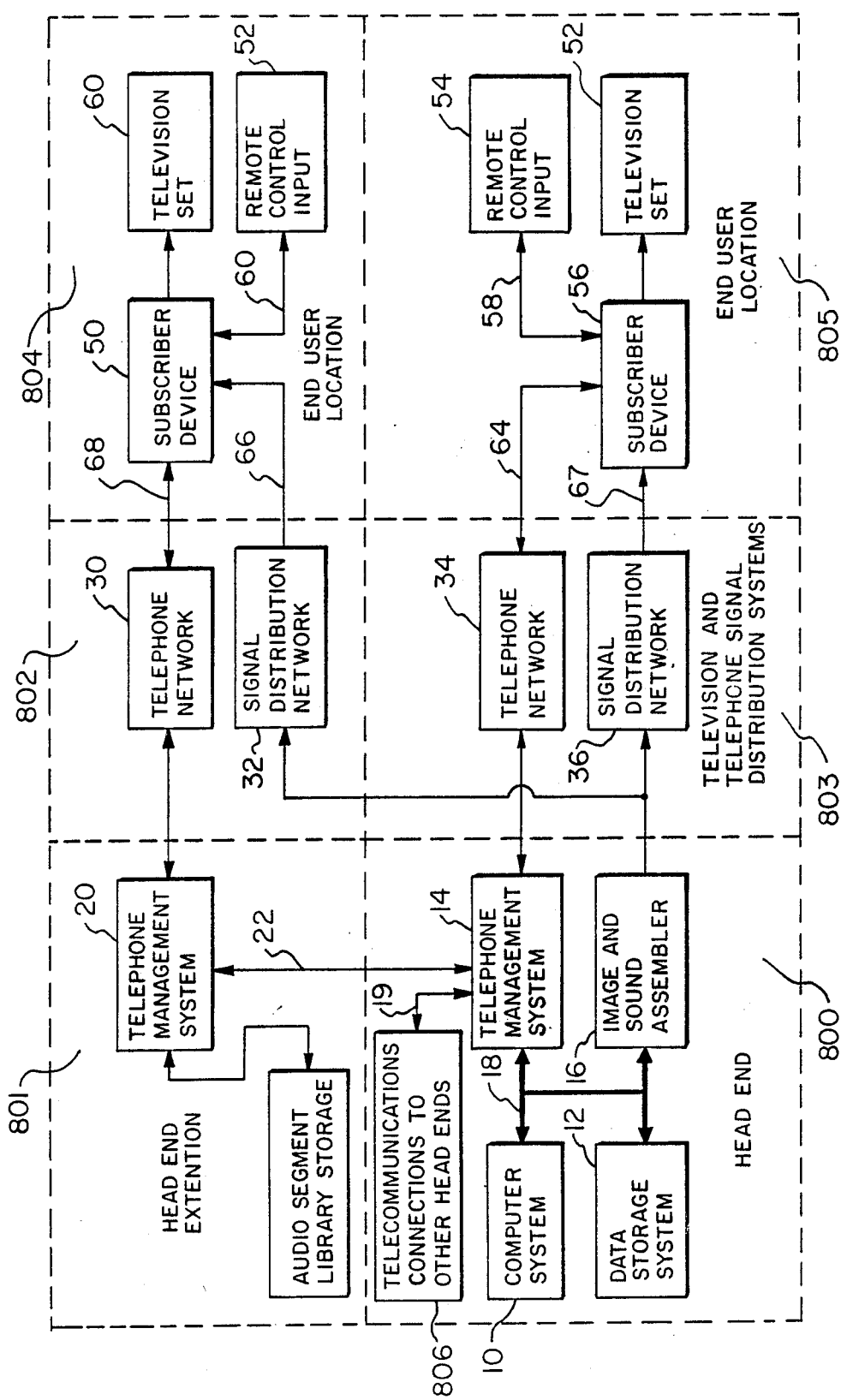
FIG. 1 is a showing of the system of the present invention.

The invention will be described with reference to the drawing, wherein the well known individual components and devices from which the invention is fabricated are shown only in block diagram form for the purpose of simplicity. The specific construction and arrangement of the devices and components that are used to fabricate the system of the invention is not essential to an understanding of the invention, and thus no attempt is made to show the detailed circuitry of these various devices and components.

FIG. 1 is a block diagram of the invention.

The major components of the system are shown outlined by dotted lines.

These major components comprise a head end 800, an optional head end extension 801, and television and telephone distribution systems 802/803, one such system for each of the two end users 804,805 that is shown in the figure.

It should be understood that head end 800 is geographically located to serve a large plurality of local end users 805, only one of which is shown in FIG. 1, through a local-line, no-charge, telephone network 34 and a TV signal distribution network 36.

In order to serve a large plurality of remote end users 804, only one of which is shown in FIG. 1, these remote end users are connected to head end 800 through a local-line (i.e. a line that is local to users 804), no-charge, telephone network 20, a leased telephone line 22 that interconnects head end 800 and head end extension 801, and a TV signal distribution network 32. While remote end users 804 may receive audio segments directly from head end 800, it is preferred that the head end's entire library of audio segments be transferred from the head end to the head end extension by way of line 22, for storage of the library at the head end extension. In this way, subsequent requests by remote end users 804 for video images having related audio segments allows these requests to be satisfied by (1) retrieval of the audio segment from the storage at head end extension 801, as (2) the related video image is retrieved from storage at head end 800, both of which are then transmitted to the requesting remote end user 804.

It is to be understood that many more than two end users 804,805 are connected to head end 800 and head end extension 801. If head end extension 801 is not provided, then all end users directly connect to head end 800. In addition, any number of head ends can be used to distribute data to a multiplicity of system end users.

A head end 800 comprises a data storage system 12, a computer system 10, an image and sound assembler unit 16, and a telephone management system 14. Data within the head end is transferred over bidirectional data path 18.

Data communication with other head ends 806 (when other head ends are provided in the system), for the purpose of general communication and data updating, is carried over standard, two-way telecommunications link(s) 19.

Head end extension(s) 801 provides for a wider geographic area of service, using a single head end computer system 10. Any number of head end extensions 801 may communicate with the head end's control computer 10 using a standard two-way, long distance, telecommunication link 22. Head end extensions 801 include a telephone management system 20 that services a multiplicity of remote end users 804. As mentioned, systems 20 may include audio segment storage facilities.

Television and telephone signal distribution is carried out over conventional networks 802,803. Telephone service networks 34 and 30, respectively, are used for two-way communication with end users 804,805 that are connected to the head end(s) 800 and/or to the head end extension(s) 801.

Television signals are transmitted to the multiplicity of users, both local and remote, using conventional transmission means. Television signals are transmitted to end users 804,805 over conventional distribution systems 32 and 36, such as broadcast, microwave and cable TV networks.

At the end user locations 804,805, end user devices 50 and 56 (also called subscriber devices or capture devices herein) perform functions such as (1) accept requests for images to be captured from transmitted carousels, (2) request images to be retrieved from storage at head end(s) 800 for transmission with user addresses, (3) decode data contained in the signals that are received from head end(s) 800, and (4) control the display of captured images, and perhaps related sound segments, on the end user's TV set.

Devices 50,56 are connected to (1) a one-way source of television signals 66,67, and (2) a source of two-way telephone communication 68,64, respectively.

TV signal sources 32,36 comprise the TV channel (or perhaps channels) that is distributed from head end 800 to the end user's television set 60,62, respectively.

The end user controls the system of FIG. 1 by inputting commands and data on a control panel that is provided on devices 50,56, or by the use of a hand held remote control input device 52,54 having a wireless infrared or other link 58, 60.

As used herein, terms such as video signal, picture, image, and the like are intended to mean a single field or frame of video. These terms do include what is commonly known as motion picture type video. A single video frame is conventionally known to comprise the interleaving of an odd and an even video field (i.e. two video fields), which form one complete image on a TV screen. Typically, sixty video fields are transmitted per second.

Figure 2A:
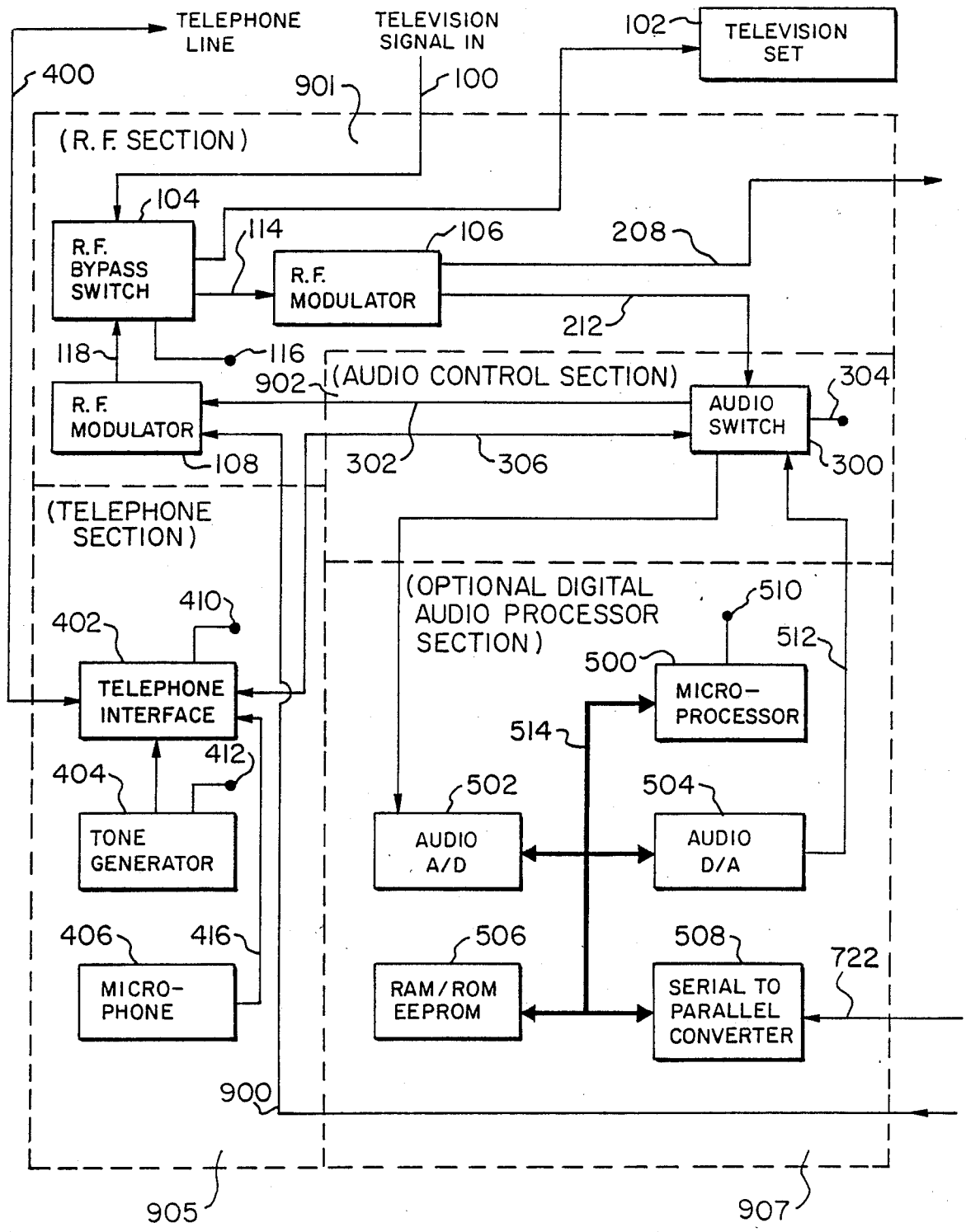
FIG. 2 is a showing of one of the subscriber devices 50,56 of FIG. 1.
Figure 2B:
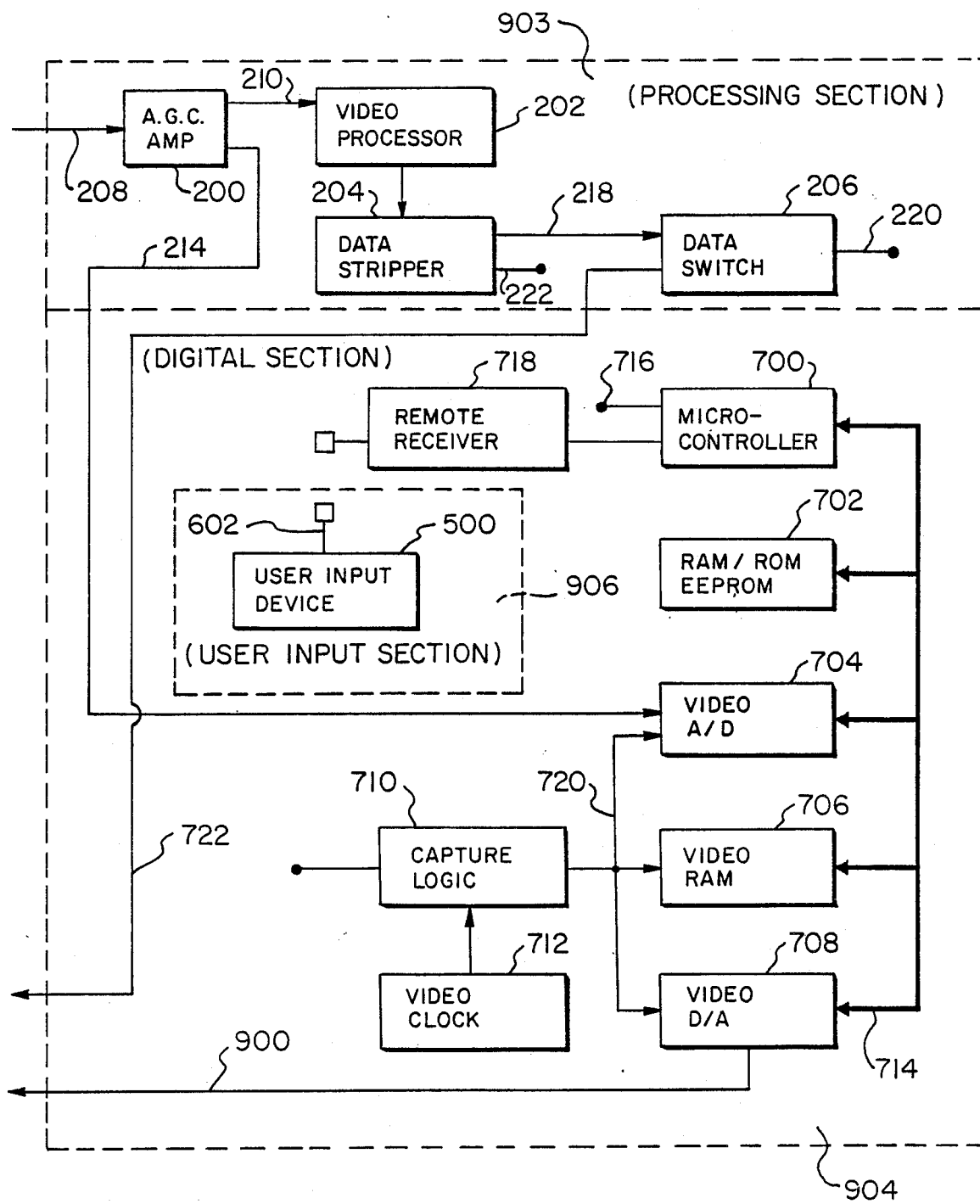

The details of construction of an end user device 50,56 of FIG. 1 is shown in FIG. 2. The main components or sections of this device are set apart by broken lines. These main sections are, an RF section 901, an audio control section 902, a processing section 903, a digital section 904, a telephone section 905, a user input section 906, and an optional digital audio processor section 907.

The apparatus of FIG. 2 is controlled by a microcontroller 700 contained in digital section 904. This microcontroller receives signals from, and delivers commands to, the various components of device 50,56, as will be described, and as is indicated by the lines that terminate in dots in FIG. 2.

With reference to FIG. 2, TV input signal 100 is the same signal that is identified as signal 67,66 in FIG. 1, and television set 102 is the same as is identified as televisions sets 60,62 in FIG. 1.

RF bypass switch 104 determines the source of the RF signal that is destined for the end user's TV set 102. The source of this RF signal is either a television signal 100 that is received from a cable TV or from another like source, or it is an RF signal 118 that is provided by RF modulator 108, which RF modulator is contained internally within the end user device of FIG. 2.

When bypass switch 104 is set to its bypass mode, TV signals and audio on line 100 are sent directly to TV set 102. A default, or power-off condition of bypass switch 104 sends the incoming television signal directly to television set 102. When bypass switch 104 is set to receive the TV channel that is devoted to the system of FIG. 1, signal 100 is sent to RF demodulator 106. In this mode of operation, the signals sent to TV set 102 are received from RF modulator 108 by way of bypass switch 104.

R.F. modulator 108 turns internal audio and video signals 302,900, respectively, into an R.F. signal 118 that is acceptable by television set 102.

Bypass switch 104 routes incoming RF television signal of the FIG. 1 system, which usually contains sound, to demodulator 106 by way of path 114. Bypass switch 104 includes a driver and relay (not shown) that are controlled by microcontroller 700 via path 116.

R.F. demodulator 106 accepts the one predetermined channel from incoming television signal 114 and demodulates an audio signal 212 and a composite video signal 208 therefrom.

Audio switch 300 receives input audio signals from (1) incoming telephone line 400 via telephone interface 402 and conductor 306, or from (2) R.F. demodulator 106, or (3) from audio D/A convertor 504. This input audio signal is supplied to R.F. modulator 108 via data path 302, under control command from microcontroller 700 via data path 304.

Audio switch 300 may also route an incoming audio signal from RF demodulator to digital audio storage 506, via audio A/D converter 502 and a processing loop. In this way, the audio signal, which may be a compressed audio signal, may be stored and/or decompressed within optional digital audio processor section 907, and then presented to RF modulator 108 by way of audio D/A convertor 504 and audio switch 300.

Telephone interface 402 allows the device of FIG. 2 (i.e. the devices 50,56 of FIG. 1) to appear as an ordinary telephone to telephone line 400. Interface 402 adjusts an internal audio signal on line 306, and the incoming audio signal on line 400, to proper levels, under control of microcontroller 700, which control is provided via data path 410.

Tone generator 404 is controlled by microcontroller 700 via data path 412, and is operable to dial phone numbers and/or send data to telephone line 400.

Automatic Gain Control (A.G.C.) amplifier 200 in processing section 903 accepts the video signal 208 from RF demodulator 106, and automatically adjusts the signal's gain, to provide proper and necessary video levels at a composite video signal 210.

Figure 3:
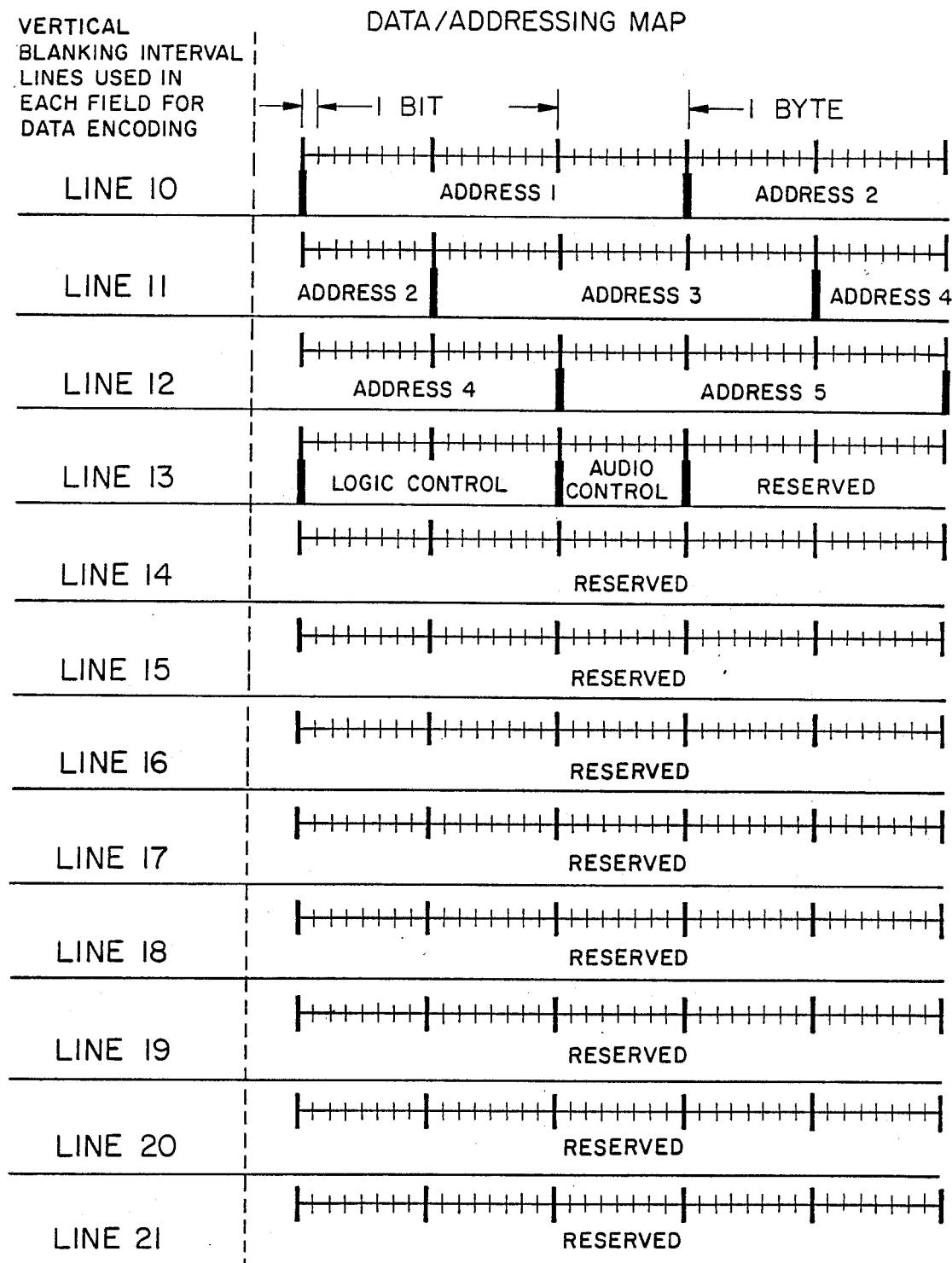
FIG. 3 shows the present invention's new and unusual manner of encoding data on the vertical blanking intervals of the video still image signals that are sent from FIG. 1's head end 800 to a particular addressed end user 804,805, which address is contained in the encoded data.

Video processor 202 decodes composite video signal 210 into its individual parts, so that data stripper 204 will know where within video signal 210 to look for the encoded data of FIG. 3, for example encoded audio. This encoded data is contained in the vertical blanking interval of video signal 210.

Data stripper 204 strips encoded data from the video signal, and converts the data to a form acceptable by microcontroller 700. In special cases, encoded audio data will be read as an entire video signal field, or in a sequence of fields, to be stored as digital audio in RAM 506 by way of serial-to-parallel converter 508. Data stripper 204 is controlled by microcontroller 700 via data path 222.

Data switch 206 routes the received stripped data 218 to microcontroller 700 via data path 220, or routes the stripped audio data to digital audio storage RAM 506 via data path 722 and serial-to-parallel converter 508, under command of microcontroller 700 via data path 220.

Microcontroller 700, in digital section 904, makes a decision as to what to do with the incoming audio and video signals, based upon (1) an internal program that is stored in ROM 702, (2) the encoded data (FIG. 3) that is carried on the video signal, and (3) data that may be entered by the end user from a remote control device 600.

Microcontroller 700 may also use the encoded data to reprogram EEPROM 702, thereby providing software upgrades for example.

Under certain conditions, microcontroller 700 writes data to video RAM 706 for use in TV on-screen character generation.

Microcontroller 700 controls and communicates with other components of digital section 904 via bidirectional data path 714, and controls and communicates with other components of FIG. 2 via bidirectional data path 716.

The video clock 712 of digital section 904 determines the frequency at which video signal 214 is sampled by video A/D converter 704, and the frequency at which a video signal is read from RAM 706 by video D/A converter 708. Clock 712 is controlled by the blanking signal frequency of the video signal. This function can be performed in any one of a number of ways known to those of skill in the art. An exemplary circuit means will be described.

Capture logic 710 operates under command of microcontroller 700 to capture an image from signal 214, for storage of the captured signal in RAM 706, so that the captured image can be provided to RF modulator 108 via path 900.

During an image capture process, microcontroller 700 (1) enables video A/D converter 704, (2) disables video D/A converter 708, (3) enables writing to video RAM 706, and (4) generates sequential addresses and chip selects for RAM 706. This process continues until the entire video field is stored in RAM 706.

During the image capture process, video A/D converter 704 accepts incoming analog video signal 214 and flash converts this signal to digital form, so that the signal may be stored in RAM 706.

Later, microcontroller 700 (1) disables video A/D converter 704, (2) enables video D/A converter 708, (3) zeroes the address generator for RAM 706, (3) enables read of RAM 706, and (4) generates sequential addresses and chip selects for RAM 706. Capture logic 710 continues to cycle through a RAM 706 read cycle, thus providing continuous TV display, until capture logic 710 is commanded by microcontroller 700 to capture another video field from the incoming video signal 100.

During the retrieval of a digital image from video RAM 706, video D/A converter 708 accepts the digitized video data from RAM 706, over data path 714, and converts this digitized data back to an analog signal 900 that is acceptable by R.F. modulator 108 and television set 102.

Video RAM 706 is a static ram of sufficient size and speed to store a digitized field of video.

Remote control is provided by user input section 906, and includes user input device 600. Device 600 includes an infrared transmitter, logic, and a key pad that enables the end user to enter data to microcontroller 700. Remote control receiver 718 is an infrared receiver having logic to convert information transmitted from remote control signal source 602 to a level that is acceptable by microcontroller 700. This capability for the end user device is optional.

Microphone 406 of telephone section 905 allows the end user to use the device of FIG. 2 as a telephone having a speaker, i.e. a speakerphone.

Optional digital audio processor 907 is a plug-in board that provides future or high end expansion. It includes an A/D converter 502, a D/A converter 504, a serial-to-parallel converter 508, RAM/ROM/EEPROM 506, a microprocessor 500, and a bidirectional data bus 514. As shown, microprocessor 500 is connected to microcontroller 700 by way of data line 510.

The purpose of optional digital audio processor 907 is to accept incoming audio, either in analog form from audio switch 300 (for example compressed audio), or in digital form from data stripper 204 via data switch 206. It then stores the incoming audio in RAM 506, to be later decompressed by microprocessor 500, and to be read back through audio D/A 504 via data path 512 for use by television set 102.

FIG. 3 illustrates an exemplary data encoding scheme that is used to encode sixty bytes of binary data, in sequence, on vertical blanking interval lines ten through twenty-one, inclusive, of the video signal 100 that is transmitted from the head end 800 of FIG. 1 to the end user devices of FIG. 2. The present invention is not to be limited to this exemplary arrangement, however. As will be explained, the timing for writing these binary bits at the head end, and for reading these binary bits at the user devices, is generated from the synchronizing signals that accompany the video images of signal 100.

As FIG. 3 shows, sixty bytes of data are encoded in sequence on the blanking interval lines 10 through 21 of each video field. The first five three-byte data segments provide user addresses 1 through address 5, respectively. The next two-byte data segment is used for logic control data, such as an identifier of the image contained in this video frame. The next one-byte data segment is used for audio control data. The last forty-two byte data segment is reserved for future use, such as user addresses, for example.

In an exemplary FIG. 3 transmission, and when the binary data of FIG. 3 accompanies an image that is contained in a carousel of images, addresses 1 through 5 may be blank, and the next two-byte field contains an identifier that identifies this individual image as being one of a carousel of images. When an end user's device capture logic contains the two-byte image identifier of this image, due to selection of the carousel image by an end user, that end user's device recognizes this two-byte field, and operates to capture this image. In this way, an end user selects images from the carousels of images.

In the event that an end user selects an image not in the carousel of images, i.e. a non-carousel image, the system's head end, upon receiving such a request, transmits the non-carousel image with the two-byte identifier of the image, and also, one of the three-byte address fields is written at the head end to contain the address of that end user. This end user's device now captures that image. In the event that the image is addressed to more than one end user, more than one address field is active, and the image is captured by the corresponding end users.

As those skilled in the art will appreciate, many means may be provided to generate clocking information enabling head end 800 to write the binary fields of FIG. 2, and enabling the end user devices to provide a clock whereby microcontroller 700 is enabled to read the encoded binary data of FIG. 3.

In an exemplary construction and arrangement where the system uses the standard NTSC television signal protocol for signal 100, the composite synchronizing signal contained in signal 100 is stripped from video signal 100 at data stripper 204. This composite sync signal is composed of several frequencies, one of which is of a frequency about 15.75 khz. A clocking square wave, equal to this horizontal frequency (HF) is produced by feeding the composite sync signal to a monostable multivibrator having a time window lying between ½ HF and HF. This produces a square wave at a frequency called "hclock".

The hclock square wave is then fed to a flip flop circuit in order to generate a fifty percent duty cycle square wave at one half of the hclock frequency. This fifty percent square wave signal is then fed to a one-hundred times phaselock loop multiplier, to provide a fifty times hclock signal that is phase locked to the horizontal sync signal.

When normal horizontal blanking techniques are applied to this fifty times hclock signal, forty pulses are generated during an active video line. By this means, the location of the serial binary data of FIG. 3 is accurately located and determined in the vertical blanking interval of signal 100.

As will be appreciated by those of skill in the art, the above exemplary teaching relative the standard NTSC television signal protocol can readily be extended to other signal transmission protocols in accordance with the teachings of this invention.

Exemplary activities of one of the end users 804,805 of FIG. 1 will now be described.

To view any one of the slide shows that are available on the system's TV channel being transmitted from head end 800, that is, one of the slide shows comprising the carousel currently being transmitted to all end users, an end user enters appropriate slide show identification data by way of the user interface section 906 (FIG. 2) of a subscriber device 50,56 (FIG. 1). The slide show program images comprising a carousel are stored at the system's head end 800 (FIG. 1), and are transmitted to end users via signal distribution networks 32,36.

By way of example, the identification data for all of the various slide shows comprising the carousel currently available from the system may be present on a welcome/menu screen of the end user's TV set when the TV set is tuned to the channel being used by the system. Of course, this information can also be provided to end users by way of a printed publication.

In response to the entry of this slide show identification data, the capture device of FIG. 2 then captures and displays the requested slide show presentation on the end user's television set 102 to which the capture device is connected. More specifically, microcontroller 700 operates to control bypass switch 104 to route the requested slide show to TV set 102, from the slide shows contained in signal 100.

Any of the system's available slide show programs, with or without audio, are available to an end user in this manner. Logging on to the system is not necessary for this type of viewing activity.

The carousel images originating from head end 800 are first placed in the head end's video buffer(s) that is a portion of image and sound assembler 16. These images are retrieved from data storage system 12 by the head end's main computer system 10, under software control.

The individual video images or signals that are stored in this video buffer contain coded data (see FIG. 3) that is contained in the signal's vertical blanking interval. This code indicates the image's status as a slide show presentation, and indicates the particular slide show series of the carousel to which the individual image belongs.

The contents of the head ends video buffer(s) is blended, in standard fashion, into a continuous television signal, along with any other images currently being transmitted by head end 800.

All active slide shows (i.e. a carousel) are transmitted continuously, making the selection of any one of them available to an end user 804,805. Selected slide shows may include an audio signal that is added to the television signal. As stated previously, when the requesting end user is a remote user, such as user 804 of FIG. 1, the audio signal may be stored at a head end extension 801.

Special trigger images are also sent to signal distribution networks 32,36. These trigger images contain special addressing that allows automatic insertion of special-interest images, and/or replacement of transmitted images by such special-interest images, at the geographic location of end users 804,805. This capability allows end users 804,805 to select slide shows of local interest, i.e. slide shows that are customized to the needs of the various individual communities that are serviced by head end 800. Such signal distribution networks 32,36 are typically located at a cable television distribution station, at a broadcast television station, or at any similar television signal distribution center servicing a community.

In summary, for this mode of operation, an end user turns on the television set 60,62 and tunes the set to the television channel that carries the system's slide show carousel signal. The end user then sets the image capture device 50,56 to operate in a system mode wherein incoming TV signal 100 is sent to RF demodulator 106. The capture device, upon power up or reset, sets a default code within its RAM/ROM/EEPROM memory 702 (see FIG. 2). The end user's device 50,56 then compares the code in its memory 702 against the code of every image being transmitted from head end 800.

Such image codes are contained in signal fields, frames or any combination thereof. An example is described with reference to FIG. 3.

Upon identifying an image with a code that matches the default code then resident in its memory 702, the device captures that image by operation of its capture logic 710, and then displays the image on the end user's television set (i.e. 60,62 of FIG. 1, or 102 of FIG. 2).

The initial TV image is typically a welcome/menu screen.

Subsequently, upon entering appropriate data to the device by way of user interface section 906, a new code is entered into the device's memory 702. This selection process by an end user provides control over which images, corresponding to the new code in memory 702, the device will subsequently capture and display on the TV set.

Thus, any of the available slide show presentations from the transmitted carousel can be displayed, one image at a time, and continuously, until another selection is made by the end user.

According to predetermined schedules, certain slide show presentations will have accompanying audio.

In the other two modes of operation, above described, an end user requests an image(s) that is present at head end 800, which image(s) is currently not a portion of the carousel currently being transmitted. In a sense, these two modes of operation can be characterized as fully-interactive. As previously noted, these images may or may not have related sound segments.

In the following description it will be assumed that the end user has already turned on and tuned the TV set and the end user device, as above described.

In order to retrieve an image and perhaps related sound from from head end 800, the end user establishes a telephone connection 400 (FIG. 2) with head end 800 (FIG. 1), using telephone section 906 (or a modem or another telephone device) via telephone network 30,34 and telephone management system 14,20 (FIG. 1).

The end user now enters end user identification data by the use of user input device 600 (or by way of a modem or another telephone device). In this way, the user identifies himself to the system, the user's identification data is verified to insure that the user is an authorized user, and the interactive session begins.

The end user now follows the instructions and/or menus present on the screen of his TV set 102, and enters the appropriate data, by way of user input device 600. In this example it will be assumed that the user enters data requesting an image that is not presently being transmitted as part of a carousel.

This image identifying data is received by telephone management system 14,20 and is interpreted by system computer 10 to cause a requested image (and perhaps a related sound segment) to be retrieved from data storage system 12. This image is now sent to image and sound assembler 16, where the image (i.e. the video signal) is addressed to the requesting user. At this point in the system, the image may also be assembled with other data, for transmission on the system's TV channel to all users along with the current carousel(s).

Related sound data, if any, may be transmitted along with the video image signal, i.e. as a TV audio track that is perhaps compressed audio, or it may be telephone-transmitted by way of telephone management system 14, or it may be retrieved from the telephone management system 20 of a head end extension and then telephone-transmitted, or it may be transmitted as sound encoded binary data in the video field(s) of the video signal transmitted by the head end (see FIG. 3).

Turning now to the reception of such video/sound signals by the end user's device of FIG. 2, a video signal(s) that is addressed (see FIG. 3) to the requesting user is recognized by microcontroller 700. As a result, capture logic 710 is controlled to route the signal from R.F. demodulator 106 and A.G.C. amplifier 200 to video RAM 706.

Under the control of capture logic 710 and video clock 712, the analog image(s) signals that are addressed to this end user are converted to a digital signal by video A/D converter 704, and they are then stored in video RAM 706.

In the event that the video image(s) captured in video RAM 760, as above described, are accompanied by audio segment(s), three modes of operation are possible, as follows;

(1) when the audio segment(s) is transmitted along with the video signal 100 (perhaps as compressed audio), as the TV channel's audio track, the audio signal is stored in digital form in RAM/ROM/EEPROM 506, by way of R.F. demodulator 106, audio switch 300, and audio A/D 502;

(2) when the audio segment(s) is transmitted by way of telephone interface 402, the audio signal is connected to an input of RF modulator 108 by way of telephone interface 402, and audio switch 300; and (3) when the audio segment(s) is transmitted as encoded binary data, by way of the video signal 100 and in a binary field(s) of FIG. 3, the audio is stored in digital form in RAM/ROM/EEPROM 506, by way of R.F. demodulator 106, A.G.C. amplifier 200, video processor 202, data stripper 204, data switch 206; and serial to parallel converter 508;

all three of these modes of audio capture being under the control of microcontroller 700.

Under the control of microcontroller 700, the captured video signal or image contained in video RAM 706 is presented to TV set 102 by way of video D/A 708, R.F. modulator 108, and bypass switch 104. In the event that a captured audio segment corresponds to the video image(s), the captured audio in RAM/ROM/EEPROM 506 is presented to TV set 102, in synchronism with the video image, by way of audio D/A 504, audio switch 300, R.F. modulator 108, and bypass switch 104.

The third mode of operation, as above described, provides a form of interactive conferencing. In this mode of operation, an end user who has been verified by the system can not only request image(s) from head end 800, but can also request that the images be addressed to a plurality of end users. When the head end transmits these images addressed to the plurality of identified end users, which may and usually does include the requesting end user, the video image(s) and perhaps related sound segments are captured as above described in video RAM 706 and in RAM/ROM/EEPROM 506 of the FIG. 2 device for each of the addressed users. These captured signals are then read out of memory and presented to the plurality of end user's TV sets, so that all of these end users may view the same image(s), perhaps while being connected to each other in a conference telephone mode.

While the invention has been described with reference to preferred embodiments thereof, it is recognized that those skilled in the art will readily visualize other embodiments of the invention upon reading the forgoing enabling description that contains the best mode of the invention. Therefore, the scope and content of this invention is not to be limited by this description, but rather the scope and content of the invention is to be as is defined by the following claims.

What is claimed is:

1. A method for providing interactive video image selection, from a library containing a plurality of video images, by a plurality of library end users, comprising, providing a library of video images at a head end, said library comprising the number X of video images, each of said video images having a unique identifier, selecting the number Y of said library video images to be continuously transmitted to said plurality of end users in carousel fashion, where said number Y is less than said number X, and where each of said Y video images is transmitted with a unique identifier, providing first means whereby an end user may request a carousel video images from said Y number of images in said carousel, by using the unique identifier for said requested carousel image, whereupon said requested carousel image is captured from said transmission by said requesting end user, providing second means whereby an end user may request a non-carousel video image that is not contained in said Y number of images in said carousel, by using the unique identifier for said requested non-carousel image, whereupon said requested non-carousel image is retrieved from said library, is addressed to said requested end user, and is transmitted to all end user, but is captured from said transmission only by said requesting end user, and providing a third means whereby an end user may request a non-carousel video image that is not contained in said Y number of images in said carousel, and may additionally request that said requested non-carousel image be addressed to a plurality of end users, whereupon said requested non-carousel image is retrieved from said library, is addressed to said plurality of end users, and is transmitted to all end users, but is captured from said transmission only by said plurality of end users.

2. The method of claim 1 including the step of including in said library a plurality of audio segments corresponding to at least some of said X video images, and in the event that an audio segment corresponds to a requested image, transmitting said audio segment to said plurality of end users.

3. The method of claim 2 wherein said head end is geographically located at the site of less than all end users, the remainder of said end users being located at a different geographic site, and including the step of providing a head end extension at said different geographic site, and providing a library of said audio segments at said head end extension, whereupon, when one of said less-than-all end users requests a video image having a corresponding audio segment, said image and segment are transmitted from said head end, and whereupon, when one of said remainder-of end users requests a video image having a corresponding audio segment, said image is transmitted from said head end, and said audio segment is transmitted from said head end extension.

4. A method for providing interactive video image selection, from a library containing a plurality of video images, by a plurality of library end users, comprising, providing a head end that is geographically located at the site of less than all end users, the remainder of said end users being located at a different geographic location, providing a library of video images at said head end, said library comprising the number X of video images each of said video images having a unique identifier, selecting the number Y of said library video images to be continuously transmitted to said plurality of end users in carousel fashion, where said number Y is less than said number X, and where each of said Y video images is transmitted with a unique identifier, providing first means whereby an end user may request a carousel video image from said Y number of images in said carousel, by using the unique identifier for said requested carousel image, whereupon said requested carousel image is captured from said transmission by said requesting end user, providing second means whereby an end user may request a non-carousel video image that is not contained in said Y number of images in said carousel, by using the unique identifier for said requested non-carousel image, whereupon said requested non-carousel image is retrieving from said library, is addressed to said requested end user, and is transmitted to all end users, but is captured from said transmission only by said requesting end user, providing in said library a plurality of audio segments corresponding to at least some of said X video images, and in the event that an audio segment corresponds to a requested image, transmitting said audio segment to said requesting end user, providing a head end extension at said different geographic location, and providing a library of said audio segments at said head end extension, whereupon, when one of said less than all end users requests a video image having a corresponding audio segment, said image and segment are transmitted from said head end, and when one of said remainder of end users requests a video image having a corresponding audio segment, said image is transmitted from said head end, and said audio segment is transmitted from said head end extension.

5. A method for providing interactive communication between a plurality of TV-image users and a data base, comprising;

providing a data base having
  (1) a library comprising a plurality of still-frame video images,
  (2) an audio sound segment corresponding to at least certain ones of said plurality of video images,
  (3) two-way telephone communication port means, and
  (4) one-way video image output port means, providing for each one of said plurality of users
  (1) two-way telephone communication port means,
  (2) still-frame video memory means, the video memory means for each of said plurality of users having an address that is unique to each of said plurality of users, and
  (3) video display means connected to receive an input from said video memory means, connecting the telephone communication port means of each of said plurality of users to the telephone communication port means of said data base; to thereby establish a two-way telephone communication link between each of said plurality of users and said data base, connecting the video memory means of each of said plurality of users to the video output port means of said data base, to thereby establish a one-way video communication link between said data base and each one of said plurality of users, whereupon selection of a still-frame video image from said library by at least one of said plurality of users causes
(1) said selected video image to be placed on the video output port means of said data base for transmission to all of said plurality of users,
(2) accompanied by the unique address of said at least one user, whereupon the video memory means of said at least one user is operable to recognize said unique address, and to thereupon store said selected video image in the addressed one of said plurality of video memory means, and in the event that an audio sound segment corresponds to said selected video image, said selection of a still-frame video image by said at least one user causes said corresponding audio sound segment to be transmitted to said at least one user by way of said two-way telephone communication link, and utilizing said two-way telephone link to select a plurality of users to whom said requested image will be addressed.

6. A device adapted to receive TV still-frame images and audio signals for presentation of the images and signals to a TV receiver, comprising input video signal port means, by-pass switch means having first input means connected to said input video signal port means, second input means, first output means adapted to be connected to a TV receiver, and second output means, said by-pass switch means having a first mode of operation wherein said first input means is connected to said first output means, having a second mode of operation wherein said first input means is connected to said second output means, and having a third mode of operation whereby said second input means is connected to said first output means, RF demodulator means having first and second output means, and having input means connected to the second output means of said by-pass switch means, RF modulator means having first and second input means, and having output means connected to the second input means of said by-pass switch means, video memory means, video A/D convertor means connecting to the first output means of said RF demodulator means to said video memory means, video D/A converter means connecting said video memory means to the first input means of said RF modulator means, controllable telephone interface means having input means adapted to be connected to a telephone line, and having output means, audio switch means having first, second and third input means, and having first and second output means, means connecting the first input means of said audio switch means to the output means of said telephone interface means to thereby present audio signals received on said telephone line to the first input means of said audio switch means, means connecting the first output means of said audio switch means to the second input means of said RF modulator means, digital memory means for storing audio signals, audio A/D converter means connecting the second output means of said audio switch to said digital memory means, audio D/A convertor means connecting said digital memory means to the second input means of said audio switch means, means connecting the third input means of said audio switch means to the second output means of said RF demodulator means, first control means connected to control said by-pass switch means to selectively provide said three modes of operation of said by-pass switch means, whereby in said first mode of operation of said by-pass switch means a video signal present at the first input means of said by-pass switch means is connected to a TV receiver by way of the first output means of said by-pass switch means, in said second mode of operation of said by-pass switch means a video signal present at the first input means of said by-pass switch means is connected to the input means of said RF demodulator means and said video signal is stored in said video memory means, and in said third mode of operation of said by-pass switch means the second input means of said by-pass switch means is connected to the first output means of said by-pass switch means and a video signal stored in said video memory means is connected to a TV receiver by way of said RF modulator means, and second control means connected to control said audio switch means to selectively provide three modes of operation of said audio switch means, whereby in said first mode of operation of said audio switch means the output means of said telephone interface means is connected to the second input means of said RF modulator means, and in said second mode of operation of said audio switch means the second output means of said RF demodulator means is connected to said digital memory means by way of said audio A/D convertor means, and in said third mode of operation of said audio switch means said digital memory means is connected to the second input means of said RF modulator means by way of said audio D/A convertor means.

7. The apparatus of claim 6 including data stripper means having input means connected to the first output means of said RF demodulator means to thereby receive encoded audio signals that may be present at said input video signal port means, and having output means, and serial-to-parallel convertor means 508 connecting the output means of said data stripper means to said digital memory means for storing said encoded audio signals.

* * * * *